Patented Sept. 16, 1930

1,776,064

UNITED STATES PATENT OFFICE

MAX BUCHNER, OF HANOVER-KLEEFELD, GERMANY, ASSIGNOR TO ALBERT MEYER-HOFER, OF ZURICH, SWITZERLAND

PROCESS FOR MANUFACTURING METAL COMPOUNDS

No Drawing. Original application filed July 22, 1924, Serial No. 727,546, and in Germany August 2, 1923. Divided and this application filed October 23, 1926. Serial No. 143,802.

This invention relates to a process of manufacturing metal compounds, relying on the reactive and special ability of complex fluorine compounds to decompose.

According to the new process first a complex fluoride of metal, whose compound is to be formed, is produced. This fluoride is decomposed into its separate fluoride constituents one of which is a simple fluoride of the metal, and another simple fluoride. The metal fluoride is then treated with a compound, whose radical it is desired to combine with the metal of the fluoride to form the metal compound desired, and a resulting fluoride. The latter is reacted upon with the other fluoride obtained by decomposing the complex fluoride and in presence of an acid or a salt to reform the starting complex hydrofluoric acid or its salt.

The object of the invention is to produce pure chemical compounds in a simple and ready manner from cheap raw materials, at but small costs.

The following formulas are illustrative of the reactions showing the manufacture of soda with the aid of hydrofluosilicic acid.

Sodium silicofluoride is produced for instance as follows:

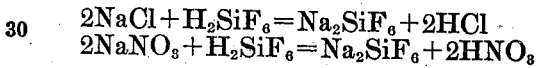

and decomposed by heating into NaF and $SiF_4$;

$$Na_2SiF_6 (heated) = 2NaF + SiF_4$$

and reacting with calcium carbonate we have $$2NaF + CaCO_3 = Na_2CO_3 + CaF_2$$

The soda is separated by dissolving it.

The reaction is more ready when working takes place with saturated solutions and under pressure, preferably with water not sufficient for dissolving the reacting compounds and while introducing carbon dioxide.

From the remaining calcium fluoride and silicon-fluoride the hydrofluosilicic acid is re-formed by the following reaction:

$$CaF_2 + SiF_4 + H_2SO_4 = CaSO_4 + H_2SiF_6$$

Metal carbonates and the like giving in the reaction insoluble fluorides are naturally most favorable.

Parallel with the manufacture of soda there can be obtained from NaF by means of calcium sulphide, calcium sulphite and calcium nitrate, the difficultly obtainable sulphides, sulphites and nitrates of alkali forming metals.

For example, for potassium nitrate the hydrofluosilicic acid may react with potassium chloride. The resulting potassium fluosilicate is decomposed by heat into potassium fluoride and silicon fluoride. The potassium fluoride is converted into potassium nitrate.

Potassium nitrate can be obtained just as well by means of potassium carbonate and nitric acid, where the potassium carbonate is produced in a manner analogous to the production of soda.

The residues from the above-mentioned reactions, fluor-spar and silicon fluoride, can be converted with acid into hydrofluosilicic acid according to the following formula:

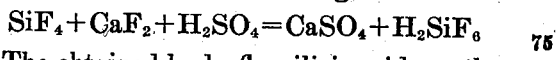

The obtained hydrofluosilicic acid or other complex fluoric acid is used for producing the complex fluoride of the metal, whose compound is to be formed. Metals or their oxides, carbonates or other salts can be used as substances that introduce the required positive radical.

Instead of recovering hydrofluosilicic acid in the example above, the necessary hydrofluosilicic alkali metal salt can be made, and thereby the cycle of manufacture can be shortened. This salt is made from the waste products, alkali earth metal fluoride, silicon fluoride and an alkali metal salt for introducing the necessary base, in presence of an acid, this acid acting as a contact substance.

The following formulas illustrate the procedure:

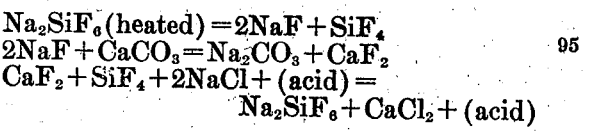

The latter reaction also proceeds without addition of acid.

The following examples giving weights will illustrate the process.

376 kg. of sodium fluosilicate is heated to 650° C. and splits into 168 kg. of sodium fluoride and 208 kg. of silicon fluoride. The 168 kg. of sodium fluoride is placed with 221 kg. of basic copper carbonate in 750 liters of water and stirred for some time, during which time 203 kg. of copper fluoride separates. The solution contains 106 kg. of sodium carbonate and 80 kg. of sodium hydroxide.

After separation and washing of the copper fluoride there is added 340 kg. of sodium nitrate dissolved in water, and acidulated with 12 kg. of 63% nitric acid. At a temperature of 80° C. of the mixture the previously separated 208 kg. of silicon fluoride is added. There results 376 kg. sodium fluosilicate, which is readily filtered and washed from the simultaneously formed copper nitrate which amounts to 375 kg.

If the complex acid is to be formed from the complex fluoride, the following will be an example:

188 kg. sodium fluosilicate is heated to 650° C. and decomposed into 84 kg. of sodium fluoride and 104 kg. of silicon fluoride. The 84 kg. of sodium fluoride is reacted upon with 303 kg. of lead sulphate in the presence of 570 liters of water at 120° C. and two atmospheres pressure. The resultant lead fluoride (245 kg.) is separated from the about 20% sodium sulphate liquor.

I then dilute 100 kg. of 98% sulphuric acid with 250 kg. of water and add thereto the 245 kg. of lead fluoride and the previously obtained silicon fluoride. There results 303 kg. lead sulphate and about 36% hydrofluosilicic acid.

By reacting upon a sodium salt, for instance, sodium chloride, with this hydrofluosilicic acid sodium silicofluoride is reproduced, and acid is obtained as by-product.

It is of advantage, to carry out the reaction between a salt and a complex fluoric acid with a solid salt.

An example for the production of soda is:
84 kg. fluoride of sodium and 100 kg. calcium carbonate are poured into 350 liters of water and agitated for some hours, until the reaction is complete. When the reaction is finished the solution of carbonate is separated and the insoluble calcium fluoride is thoroughly washed. The filtrate and the wash water yield, after evaporation and calcination of the residue, 100 kg. of sodium carbonate.

The calcium fluoride is converted into sodium fluosilicate by means of 120 kg. salt (NaCl) in a weak, hot hydrochloric acid solution, and the silicon fluoride remaining from the cyclic process, which latter is put directly into the hydrochloric acid solution. The sodium fluosilicate is decomposed by heating into sodium fluoride and silicon fluoride, both of which are returned into the cycle of operations.

Working with the compounds of complex fluoric acids other than hydrofluosilicic acid the process takes place in the same manner as in the above examples.

The manufacture of potassium carbonate by means of a complex fluoric compound, as potassium borofluoride, is as follows:

The fluoride is decomposed by heating it into potassium fluoride and boron fluoride. The potassium fluoride is then reacted upon with an insoluble carbonate, as calcium carbonate, to form insoluble calcium fluoride and potash ($K_2CO_3$) in the presence of water, not sufficient to dissolve the resulting carbonates. The precipitate is filtered off and washed with water. The boron fluoride resulting from the decomposition of the potassium borofluoride, is converted into potassium borofluoride by means of hydrochloric acid that contains the calcium fluoride resulting from the final reaction as well as the necessary amount of potassium chloride.

I claim:

1. A process for manufacturing metal compounds consisting in first forming a complex fluoride of a metal whose compound is to be formed, decomposing the latter into its separate fluoride constituents one of which is a simple fluoride of the metal, and another simple fluoride, treating the metal fluoride with a compound whose non-metallic radical is to be bound to the metal of the fluoride to form the metal compound desired, and a resulting fluoride, reacting upon the resulting fluoride and said other fluoride with an acid to re-form the complex hydrofluoric acid.

2. A process for manufacutring metal compounds consisting in first forming a complex fluoride of a metal whose compound is to be formed, decomposing the latter into its separate fluoride constituents one of which is a simple fluoride of the metal, and another simple fluoride, treating the metal fluoride with a compound whose non-metallic radical it is to be bound to the metal of the fluoride to form the metal compound desired, and a resulting fluoride, reacting upon the resulting fluoride and said other fluoride with an acid to re-form the complex hydrofluoric acid, that is converted with a salt of such metal, whose compound is to be formed into a complex fluoride and an acid as by-product.

3. In a process for manufacturing metal compounds from a complex fluoride of a metal whose compound is to be produced, decomposing this complex fluoride by heat into a fluoride of the metal and another fluoride, reacting upon the metal fluoride with a compound whose non-metallic radical is to be bound to the metal of the fluoride to form the desired metal compound and a resulting fluoride, reacting upon the resulting fluoride and said other fluoride with a salt to produce the starting complex fluoride.

4. In a process for manufacturing metal compounds from a complex fluoride of a metal whose compound is to be produced, decomposing this complex fluoride by heat into a fluoride of the metal and another fluoride, reacting upon the metal fluoride with a compound whose non-metallic radical is to be bound to the metal of the fluoride to form the desired metal of the fluoride compound and a resulting fluoride, reacting upon the resulting fluoride and said other fluoride with a salt in the presence of an acid to produce the starting complex fluoride.

5. In a process for manufacturing metal compounds, first forming a complex fluoride of a metal whose compound is to be formed, decomposing the latter into its separate fluoride constituents one of which is a simple fluoride of the metal and another simple fluoride, treating the metal fluoride with a salt of the acid which is desired to combine with the metal to form the metal compound desired, and a resulting fluoride, and reacting upon the resulting fluoride and said other fluoride with an acid to re-form the complex hydro-fluoric acid.

6. In a process for manufacturing metal compounds from a complex fluoride of a metal whose compound is to be produced, decomposing this complex fluoride by heat into a fluoride of the metal and another fluoride, reacting upon the metal fluoride with a salt of the acid which is to be bound to the metal of the fluoride to form the desired metal compound and a resulting fluoride, and reacting upon the resulting fluoride and said other fluoride with a salt in the presence of an acid to produce the starting complex fluoride.

7. The process of forming metal compounds, which comprises reacting upon a salt of an alkali forming metal with a complex fluoric acid, decomposing the resulting complex fluoride of the metal into a simple fluoride of the alkali forming metal and another fluoride, reacting on the fluoride of the alkali forming metal with a reagent whose negative radical it is desired to combine with said metal, and re-converting the resulting fluoride and said other fluoride by an acid into the complex fluoric acid.

8. The process of forming metal compounds, which comprises, reacting upon alkali metal salts with a complex fluoric acid to form a complex alkali metal fluoride and an acid, decomposing the complex fluoride into a simple alkali metal fluoride and another simple fluoride, reacting on the alkali metal fluoride with a compound containing a radical it is desired to unite with the alkali metal of said metal fluoride, and forming an alkali metal salt and a second fluoride, reacting upon said second fluoride and said other fluoride with an alkali metal salt in the presence of an acid to re-form the complex alkali metal fluoride.

9. The process of forming metal compounds, which comprises reacting upon an alkali metal salt with a complex fluoric acid to form a complex alkali metal fluoride and an acid, decomposing the complex alkali metal fluoride into a simple alkaline metal fluoride and another fluoride, converting the alkali metal fluoride by another metal compound into an alkali metal salt and a resulting fluoride in the presence of a solvent for the alkali metal salt obtained the quantity of said solvent being insufficient to dissolve the whole of the alkali metal salt formed, and converting the resulting fluoride and said other fluoride into the starting complex compound.

10. The process of producing metal compounds, which comprises reacting upon an alkali metal salt with a complex fluoric acid, decomposing the resulting alkali metal complex fluoride into a simple alkali metal fluoride and another fluoride, reacting upon the latter alkali metal fluoride with a carbonate in the presence of carbon di-oxide to form alkali metal carbonate and a resulting fluoride, and converting said resulting and other fluoride into the starting complex fluoride.

In testimony that I claim the foregoing as my invention, I have signed my name.

Dr. MAX BUCHNER.